United States Patent [19]
Ojima et al.

[11] Patent Number: 5,404,926
[45] Date of Patent: Apr. 11, 1995

[54] ROLLER SHADE FOR NON-RECTANGULAR OPENINGS

[75] Inventors: Juji Ojima; Ken Suzuki, both of Kanagawa, Japan

[73] Assignee: NHK Spring Co., Ltd., Yokohama, Japan

[21] Appl. No.: 26,255

[22] Filed: Mar. 4, 1993

Related U.S. Application Data

[63] Continuation of Ser. No. 912,054, Jul. 7, 1992, abandoned, which is a continuation of Ser. No. 703,177, May 20, 1991, abandoned.

Foreign Application Priority Data

| May 23, 1990 | [JP] | Japan | 2-132871 |
| Nov. 30, 1990 | [JP] | Japan | 2-340215 |

[51] Int. Cl.⁶ .................................................. B60J 1/20
[52] U.S. Cl. ................................. 160/280; 160/287; 160/310; 160/370.21; 296/97.4
[58] Field of Search ............ 160/265, 274, 280, 370.2, 160/310, 287; 296/97.1, 97.4, 97.7, 97.8

[56] References Cited

U.S. PATENT DOCUMENTS

| 735,562 | 8/1903 | Murphey | 160/277 |
| 783,587 | 2/1905 | Nicewaner | 160/265 |
| 916,389 | 3/1909 | Cowell et al. | 160/274 X |
| 1,291,389 | 1/1919 | Brixey | 160/265 |
| 1,777,545 | 10/1930 | Bergman | 160/265 |
| 4,341,253 | 7/1982 | Eyerle | 160/287 X |
| 4,758,041 | 7/1988 | Labeur | 160/280 X |
| 4,818,007 | 4/1989 | Mahoney | 296/97.7 X |
| 4,898,224 | 2/1990 | Woodworth | 160/370.2 X |
| 4,979,775 | 12/1990 | Klose | 160/370.2 X |

*Primary Examiner*—David A. Scherbel
*Assistant Examiner*—Derek J. Berger
*Attorney, Agent, or Firm*—Baker & Daniels

[57] ABSTRACT

A roller shade comprising a spring-loaded retractor, a screen sheet having a trailing edge connected to the retractor, and a rod member attached to a leading edge of the screen sheet. The two ends of the rod member are guided by a pair of guide rails so that the rod member may be moved toward and away from the retractor by using a power drive unit in such a manner that the screen sheet may be paid out from the retractor and extended against the spring force acting on the retractor, and retracted or wound around the retractor, as desired. The rod member incorporates therein a telescopic structure which allows its length to be varied according to the change in the distance between the guide rails as the rod member is moved toward and away from the retractor. Thus, the roller shade can be adapted to windshields, windows or other openings having trapezoidal, curved or other non-rectangular shapes.

35 Claims, 10 Drawing Sheets

ROLLER SHADE FOR NON-RECTANGULAR OPENINGS

This is a continuation of application Ser. No. 07/912,054, filed Jul. 7, 1992, now abandoned, which is a continuation of application Ser. No. 07/703,177, now abandoned, filed May 20, 1991.

TECHNICAL FIELD

The present invention relates to a roller shade which may be used as a screen on windshields, windows and other forms of opening, and as a partition between a passenger compartment and a luggage compartment of a vehicle.

BACKGROUND OF THE INVENTION

Windows and windshields for vehicles such as road vehicles, aircraft, and ships, and buildings such as homes, public buildings and garages are often provided with roller shades for the purpose of shielding the sunbeam and/or preventing the view from outside. Also, a cover may be provided between the passenger compartment and the luggage compartment of a vehicle as a partition. Covering the luggage compartment of a vehicle is preferable to the end of discouraging theft.

A typical roller shade comprises a spring-loaded retractor attached to a lower end of an opening such as a rear windshield, an opaque or semi-transparent screen sheet having a trailing edge attached to the retractor, and a rod member attached to the leading edge of the screen sheet. The screen sheet is normally wound around the retractor, and can be paid out from the retractor by pulling out the rod member away from the retractor. Typically, the rod member may be hooked or otherwise secured to an upper end of the opening with the screen sheet in its fully extended condition. When the rod member is disengaged from the upper end of the opening, the screen sheet is retracted and wound around the retractor by a spring incorporated therein.

Such roller shades have been widely used in various applications. However, for functional and aesthetic reasons, windshields, windows and other openings may not be exactly rectangular, but may have circular, semi-circular, elliptic, semi-elliptic, triangular, trapezoidal and other non-rectangular shapes. In such a case, the conventional roller shade is quite inadequate for its purpose because the screen sheet of the conventional roller shade is rectangular in shape, and cannot adapt itself to the change in the width of the opening as the rod member is moved away from the retractor.

BRIEF SUMMARY OF THE INVENTION

In view of such problems of the prior art, a primary object of the present invention is to provide a roller shade which can be used on windshields, windows, openings and other designated areas having circular, semi-circular, elliptic, semi-elliptic, triangular, polygonal, trapezoidal and other non-rectangular shapes.

A second object of the present invention is to provide a simple roller shade which is suitable for use in automobiles.

A third object of the present invention is to provide a roller shade which is adapted to be actuated by a power drive unit.

These and other objects of the present invention can be accomplished by providing a roller shade for covering a designated area such as an opening or a window, comprising: a laterally elongated retractor provided on a first side of the designated area; a screen sheet having a trailing edge connected to the retractor and a leading edge; a rod member attached to the leading edge of the screen sheet; guide means for guiding the rod member at its two ends along each side of the area adjacent an associated one of two ends of the first side; and biasing means for urging the retractor in a direction to retract and wind the screen sheet around the retractor; the rod member being provided with a telescopic structure allowing its length to be varied as the rod member moves toward and away from the retractor along the guide means.

Thus, the roller shade can be adapted to windshields, windows or other openings having trapezoidal, curved or other non-rectangular shapes.

For automotive applications, it is preferable to include powered drive means for moving the rod member in a direction to extend the screen sheet by pulling the rod member away from the retractor. Such drive means may consist of a reel actuated by an electric motor, two spans of wire each connected to an end of the rod member, and wire guide means for guiding the two spans of wire between the two ends of the rod member and the reel. By using a single span of wire having a first end connected to a fixed point located adjacent an end of a second side opposite the first side, a middle part passed through the rod member from one end thereof adjacent the fixed point to the other end thereof, and a second end connected to the reel, instead of the two spans of wire, it is possible to simplify the structure of the reel for winding the wire.

According to a preferred embodiment of the present invention, the rod member consists of an outer tube and a pair of inner rods each telescopically received in an associated one of two extreme ends of the outer tube. Further, an outer end of each of the inner rods may be guided by guide means by way of a slider which is slidably engaged by the guide means and pivotally coupled to the outer end of the inner rod in order to ensure smooth guiding action of the guide means even when the guide means is required to guide the two ends of the rod member along a curved path. For the convenience of assembly and repair as well as for precaution against any failure in the drive means to actuate the rod member, the sliders may be detachably coupled to the outer ends of the inner rods, respectively. To the end of avoiding interferences with other members and maximizing the usable space, the rod member may be curved as desired.

The opening or the designated area may consist of a trapezoidal automotive rear windshield, an opening defined by a front edge of a rear shelf, inwardly curved side pillars and a roof of a passenger car, or a boundary between a passenger compartment and a luggage compartment of a vehicle. The screen sheet may be either rectangular or non-rectangular. There may be cases where the opening has a non-rectangular shape, and the guide rails are accordingly inclined or curved with respect to the lower edge of the opening, but it is desired to use a standard rectangular screen sheet having a fixed width.

BRIEF DESCRIPTION OF THE DRAWINGS

Now the present invention is described in the following with reference to the appended drawings, in which:

FIG. 10b is an enlarged view of a part of FIG. 10a;

DETAILED DESCRIPTION OF THE PREFERRED EMBODIMENTS

Figure 1:
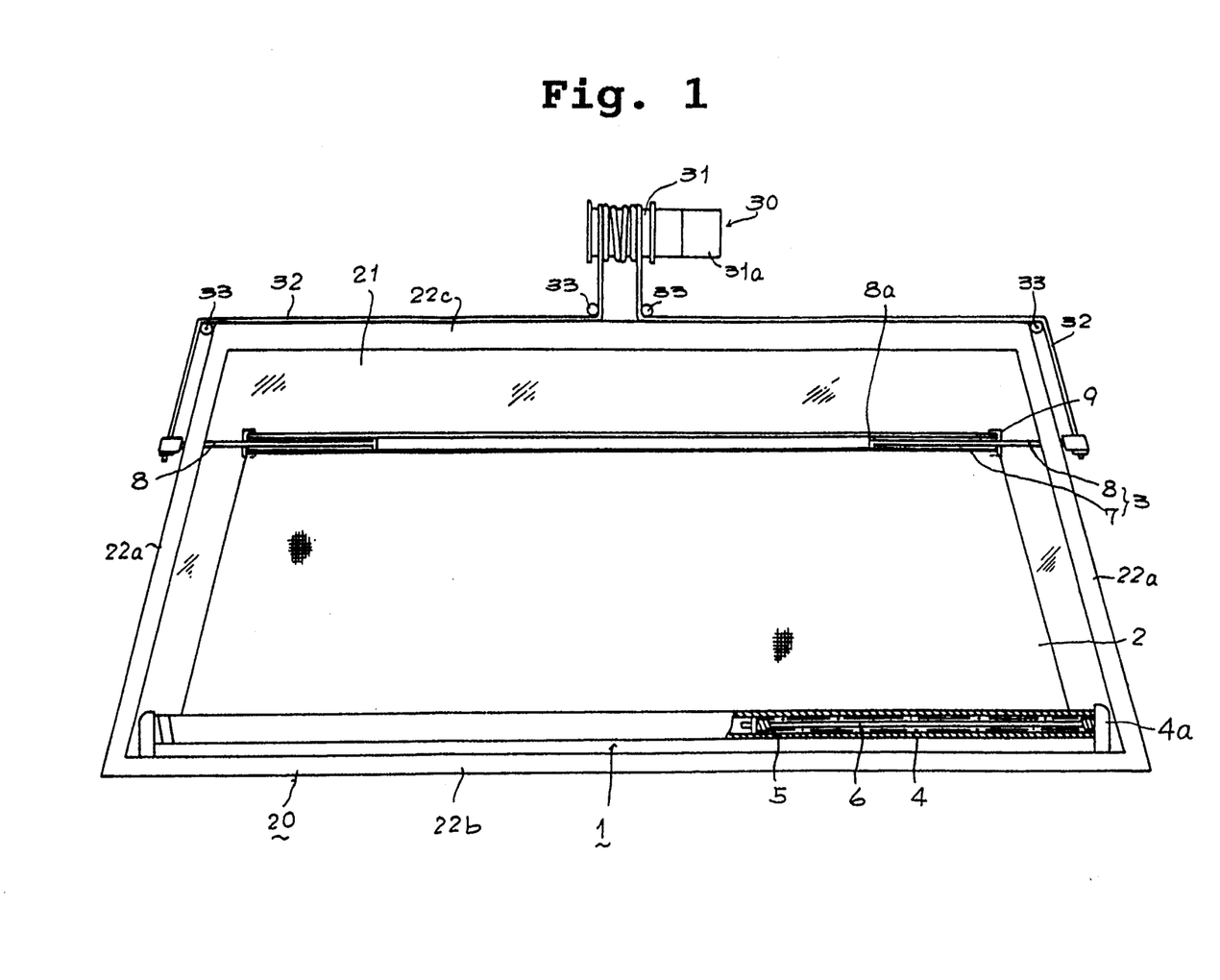
FIGS. 1 through 4 are front views of first through fourth embodiments of the roller shade according to the present invention.

FIG. 1 shows a first embodiment of the roller shade according to the present invention which comprises a retractor 1, a screen sheet 2 adapted to be rolled up by this retractor 1, and a rod member 3 attached to the leading edge of the screen sheet 2.

The retractor 1 comprises a winding drum 4 rotatably supported at its two ends by stationary brackets 4a, and a pair of torsion coil springs 5 accommodated in the winding drum 4, each of the torsion coil springs 5 being connected to the winding drum 4 at its one end and to the corresponding stationary bracket 4a at its other end, so that the winding drum 4 may be so biased to wind the screen sheet 2 around itself.

The screen sheet 2 may consist of fabric, film or other suitable material, and, when the screen is desired to have a certain transparency for ensuring the view through the screen as often the case in automotive applications, it may be made of mesh, perforated fabric, semi-transparent film and other at least partly transparent material. The base end or the trailing edge of this screen sheet 2 is secured to the winding drum 4, and the torsion coil springs 5 are given with an initial stress which is sufficient to completely wind the screen sheet 2 around the winding drum 4 when the screen sheet 2 is allowed to move freely.

The rod member 3 comprises an outer tube 7, and a pair of inner rods 8 placed in two ends of the outer tube 7 in a telescopic manner. The trailing edge of the screen sheet 2 is secured to the outer tube 7. To ensure smooth telescopic movement between the outer tube 7 and the inner rods 8, the internal end of each of the inner rods 8 is provided with a shoe 8a which slides over the inner circumferential surface of the outer tube 7, and each of the open ends of the outer tube 7 is provided with a cap 9 provided with an opening so dimensioned as to allow the inner rod 8 to be passed freely therethrough, substantially without any play in each case.

In the first embodiment illustrated in FIG. 1, this roller shade is applied to an automotive rear windshield 20 which is trapezoidal in shape. This rear windshield 20 consists of a trapezoidal glass sheet 21, and a window frame 22 provided along the edge of the glass sheet 21. The two, inclined lateral sides of the window frame 22 are each provided with a guide rail 22a for guiding a corresponding end of the rod member 3.

The screen sheet 2 of this embodiment is generally trapezoidal in shape, and its longer bottom edge, along with the retractor 1, has a substantially same length as the lower edge of the glass sheet 21 of the rear windshield 20 while its upper edge, along with the outer tube 7 of the rod member 3, has a substantially same length as the upper edge of the glass sheet 21 of the rear windshield 20. Thus, this roller shade is mounted on this rear windshield 20 by securing the retractor 1 on the lower edge of the rear windshield 20 over its entire width, and slidably guiding the two ends of the rod member 3, or more specifically, the outer ends of the inner rods 8, along the guide rails 22a provided along the two lateral sides of the rear windshield 20, respectively.

This roller shade is provided with a power drive means 30 for extending the screen sheet 2. This power drive means 30 comprises a winding reel 31 attached to a part of the vehicle body immediately above a central upper part of the rear windshield and connected to an electric motor 31a, two spans of wire 32 each connected to the outer end of a corresponding one of the inner rods 8 at its one end and to the reel 31 at its other end, and a pair of idle pulleys 33 for each span of wire 32 disposed near the reel 31 and an upper corner of the rear windshield 20, respectively, for guiding the wire 32 along the periphery of the rear windshield 20.

The winding reel 31 can be activated by a control unit which, for instance, may be mounted on the dashboard. The screen sheet 2 may thus be fully extended by actuating the winding reel 31 against the biasing force of the torsion coil springs 5 incorporated in the retractor 1, and be retracted by reversing the motor 31a. Alternatively, it is also possible to so provide that the screen sheet 2 may be retracted by releasing a braking mechanism not shown in the drawings, which can retain the screen sheet 2 at the current position, under the spring force of the torsion coil springs 5.

Since the rod member 3 is provided with the telescopic structure as described above, it can extend to its full length when the screen sheet 2 is fully retracted and the rod member 3 is situated right next to the lower edge of the rear windshield 20 or the retractor 1, and can reduce its length as it is guided upward along the guide rails 22a until its length becomes substantially equal to the width of the upper edge of the rear windshield when the rod member 3 reaches its uppermost position right next to the upper edge of the rear windshield 20.

Figure 2:
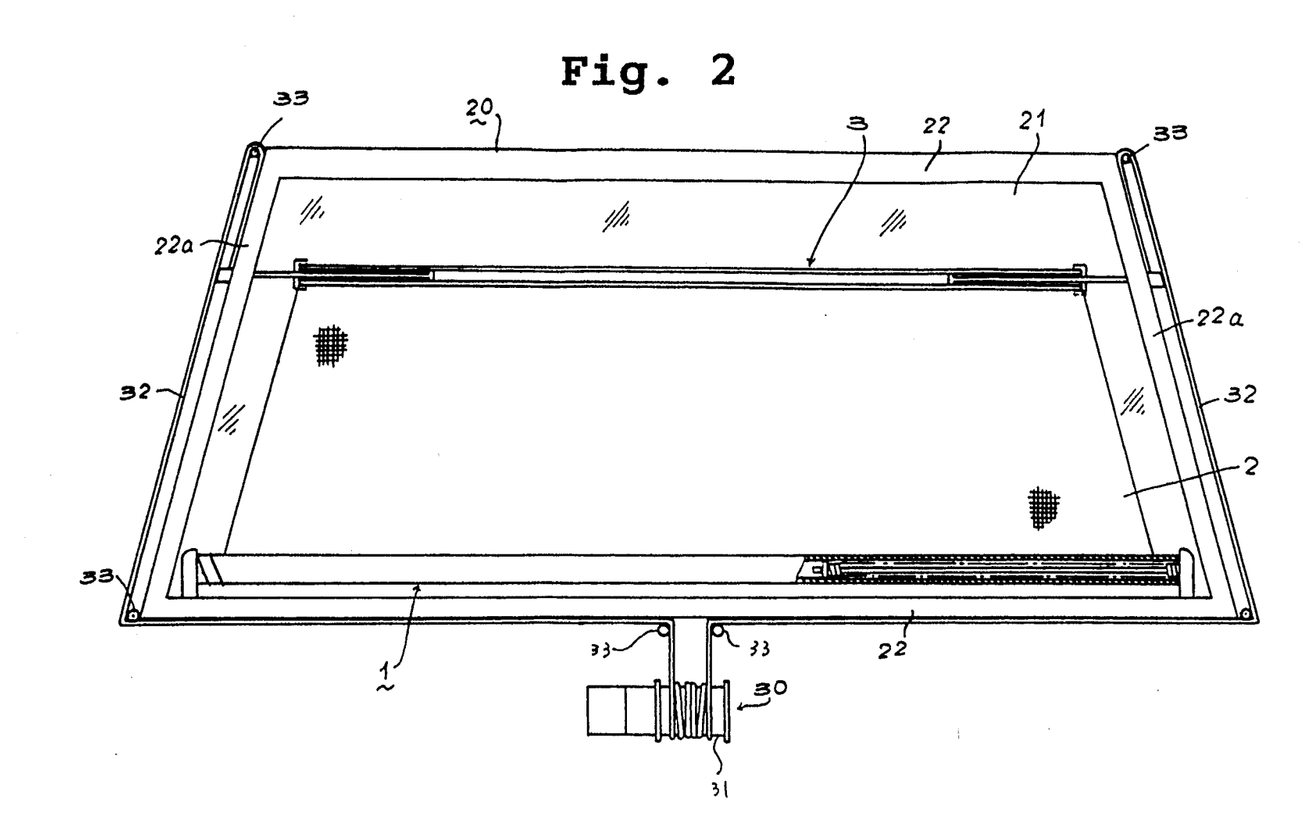

FIG. 2 shows a Second embodiment of the roller shade according to the present invention. In this case, the winding reel 31 is placed immediately below a central part of the lower edge of the rear windshield 20. In this case, two spans of wire 32 are used, and each of them is guided by three idle pulleys 33 provided, near the winding reel 31, on an upper corner and a lower corner, respectively, on one or the other side of the rear windshield 20. Otherwise, this embodiment is similar to the first embodiment.

Figure 3:
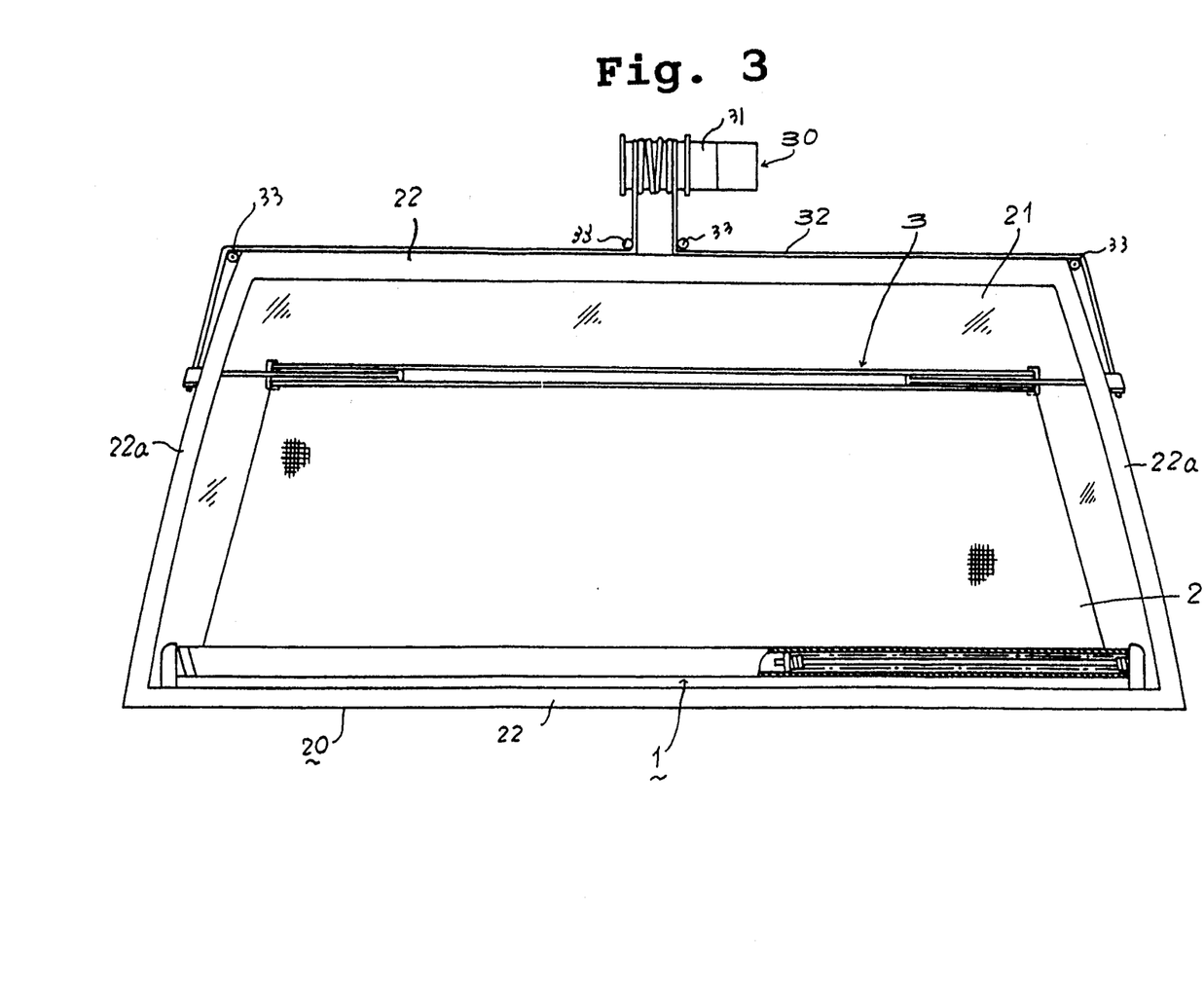

FIG. 3 shows a third embodiment of the present invention which is similar to the first embodiment, but the lateral sides of the window frame along with the guide rails 22a, in this case, are curved with each outwardly facing side given with a convex profile. The telescopic structure of the rod member 3 can adapt its length to any complicated change in the lateral width of the rear windshield 20 without any problem.

Figure 4:
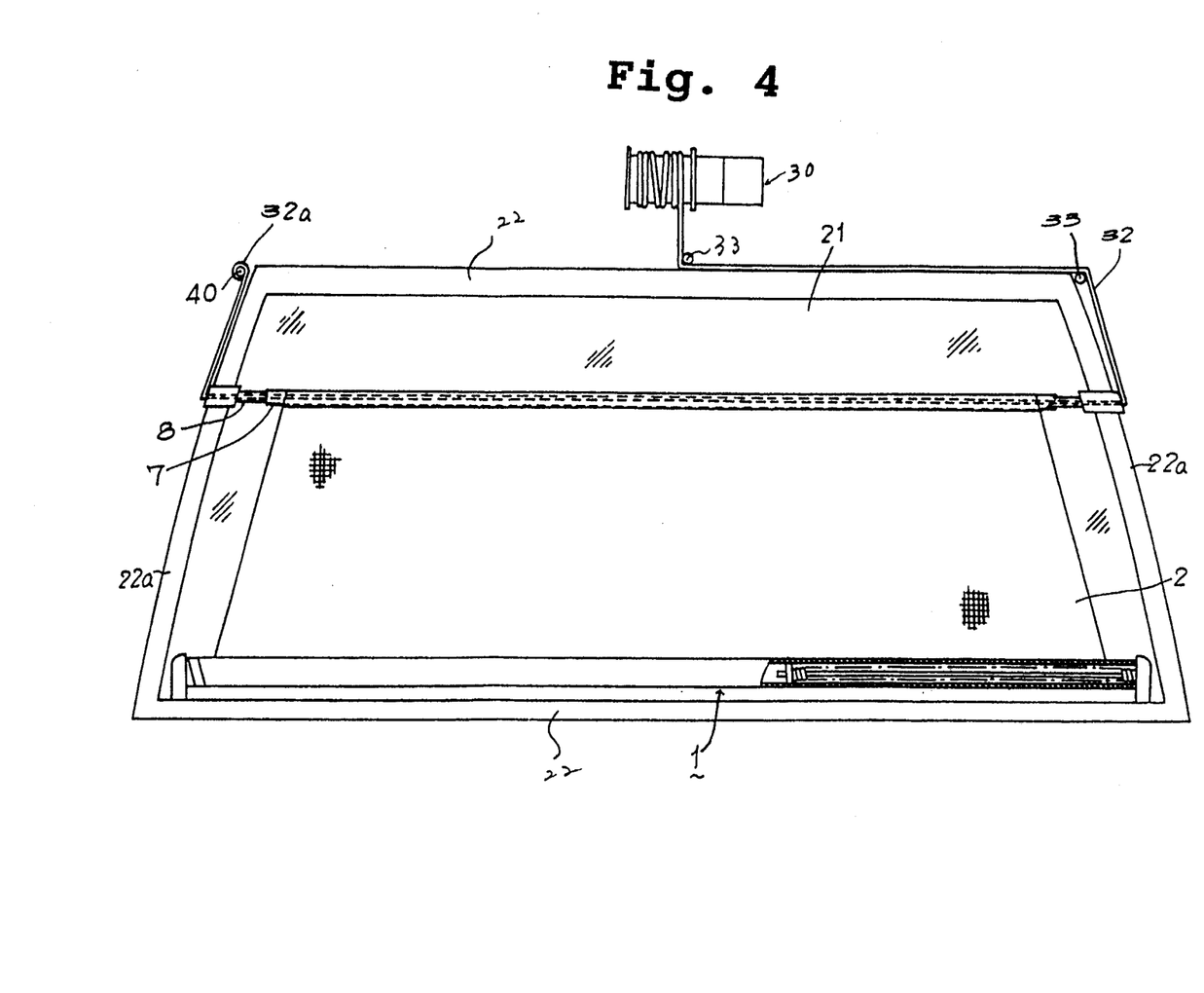

FIG. 4 shows a fourth embodiment of the roller shade according to the present invention. This embodiment is similar to the first embodiment, but only one span of wire 32 is used for actuating the rod member 3. In the embodiment, the inner rod 8 consists of a hollow tubular member. One end 32a of the wire 32 is secured to an engagement member 40 provided on the upper left corner of the rear windshield 20, passed through the rod member 3 (through the inner rods 8 and the outer tube 7), passed around two idle pulleys 33 on the upper left corner and a central part of the upper edge of the rear windshield 20, respectively, and then to the winding reel 31.

Now, several variations of the structure for guiding the external end of each of the inner rods along the corresponding guide rail are described in the following with reference to FIGS. 5 through 8.

Figure 5:
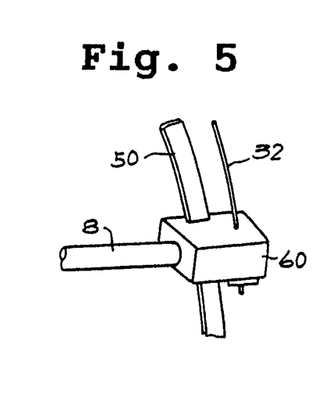
FIGS. 5 through 9 are fragmentary perspective views showing different embodiments of the guide rail structure according to the present invention.

In the embodiment illustrated in FIG. 5, to the external end of the inner rod 8 is fixedly attached a slider 60 which is slidably fitted on a guide rail 50 having a rectangular cross-section. One end of the wire 32 is fixedly secured to the slider 60. According to this embodiment, since the angular relationship between the slider 60 or the external end of the inner rod 8 is fixed, this embodiment is suitable for use with a windshield having oblique but straight lateral sides.

Figure 6:
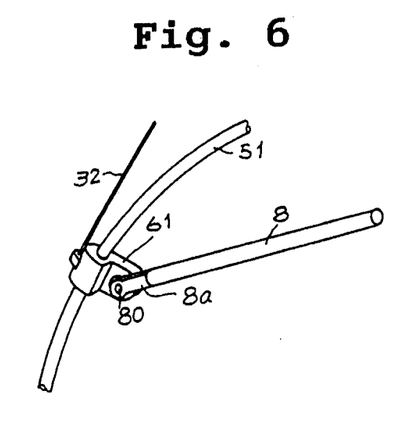

According to the embodiment illustrated in FIG. 6, each outer end 8a of the inner rod 8 is connected to a slider 61 via a pivot pin 80. The slider 61 is slidably fitted on a curved rod 51 having a circular cross section. Since the pivot pin 80 allows the rotation of the slider 61 relative to the inner rod 8 around an axial line perpendicular to a plane defined by the guide rail 51, and the slider 61 can rotate around the guide rail 51, the guide rail 51 may be two-dimensionally or three-dimensionally curved. To the slider 61 is connected an end of wire 32 for actuating the rod member 3.

Figure 7:
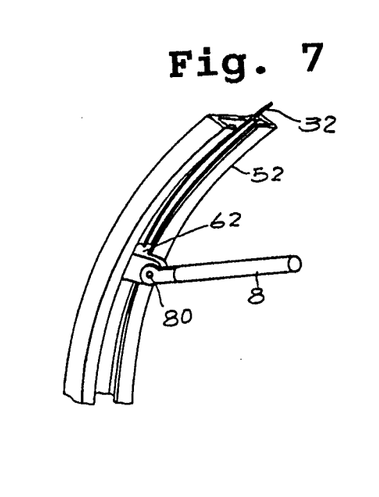

In the embodiment illustrated in FIG. 7, the outer end of the inner rod 8 is connected to a slider via a pivot pin 80 in the same way as in the previous embodiment. But, the slider 62 is received in a slot defined by a channel shaped guide rail 52 having a C-shaped cross-section. In this case also, the guide rail 52 may be two-dimensionally curved, and the slider 62 can still be guided by the guide rail 52.

Figure 8:
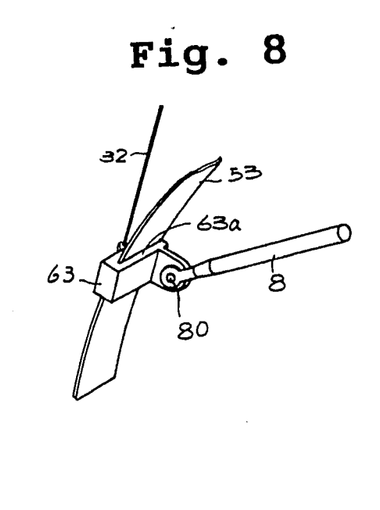
Figure 9:
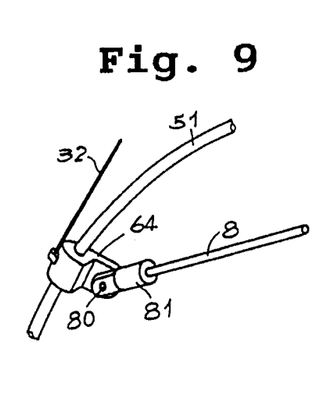

In the embodiment illustrated in FIG. 8, the guide rail 53 consists of an elongated planar member, and a slider 63 fitted on the guide rail 53. The slider 63 has an open-ended slit 63a for receiving the guide rail 53 therein, and is thus provided with a C-shaped cross-section so as to be fitted onto the guide rail 53 from sideways. The inner rod 8 is pivotally connected to this slider 63 via a pivot pin 80 in the same way as in the previous embodiments. Since the slider 63 can be readily detached from the guide rail 53 when necessary, one can obtain the convenience of assembly and repair as well as a precautionary measure against any failure in the drive means to actuate the rod member.

The embodiment illustrated in FIGS. 8 through 11 is similar to the embodiment illustrated in FIG. 6, but has a special coupling member 81 for coupling the inner rod 8 to the slider 64 which is now described in the following with reference to FIGS. 10a and 10b.

Figure 10A:
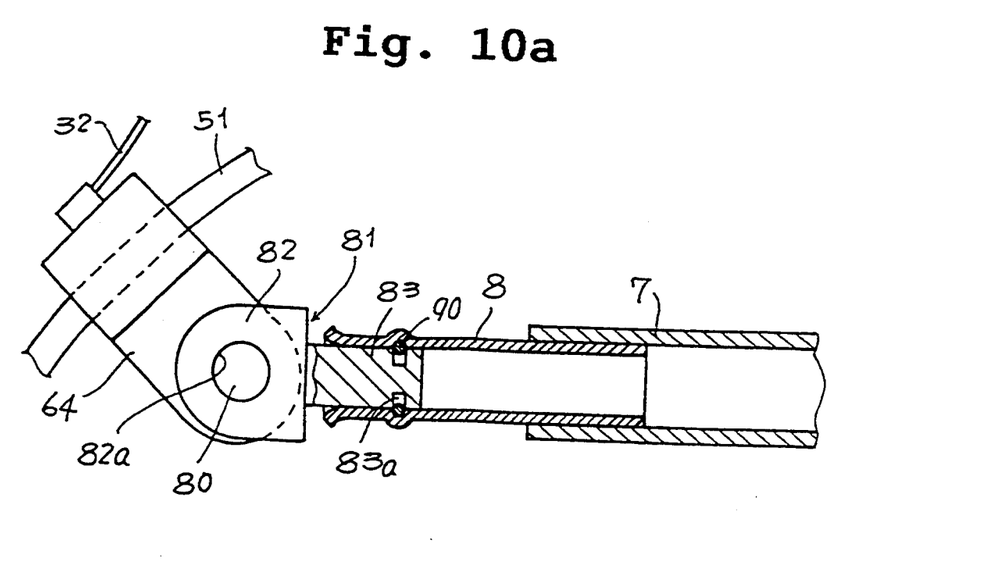
FIG. 10a shows a part of FIG. 9 in greater detail partly in section.
Figure 10B:
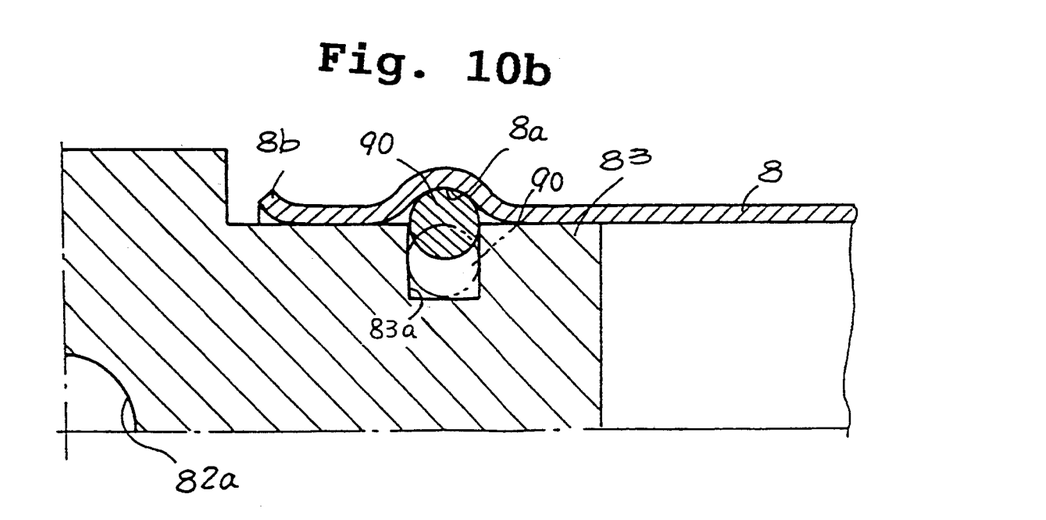
Figure 11:
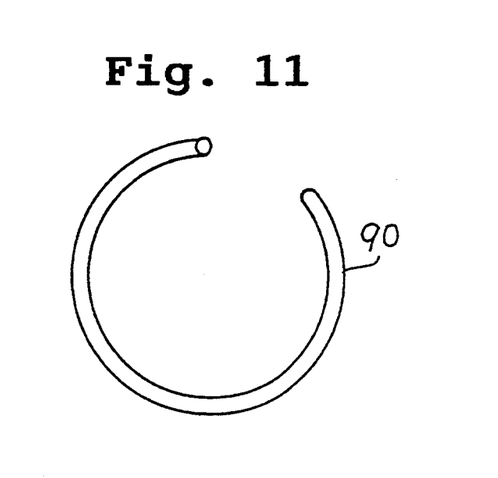
FIG. 11 is an enlarge perspective view of the snap ring used in the embodiment illustrated in FIGS. 9, 10a and 10b.

The coupling member 81 consists of a main body 82 provided with an opening 82a for receiving the pivot pin 80 therein, and a rod portion 83 provided with a cylindrical shape. The rod portion 83 is provided with an annular recess 83a on its outer circumferential surface. The inner rod 8 which is slidably received in the outer tube 7 consists of a hollow tubular member, and is provided with an annular bead defining an annular recess 8a in the inner circumferential surface which is coextensive with the annular recess 83a of the rod portion 83. A C-shaped snap ring 90 as illustrated in FIG. 11 is placed in the annular space jointly defined by the annular recesses 83a and 8a of the rod portion 83 and the inner rod 8, respectively. The depth and width of the annular recess 83a of the rod portion 83 are large enough to completely receive the snap ring 90 therein in its compressed state.

Thus, according to this embodiment, the coupling 81 may be connected to the inner rod 8 by placing the snap ring 90 in the annular recess 83a of the rod portion 83, and fitting the inner rod 8 onto the rod portion 83 of the coupling 81 while forcing the snap ring 90 into the annular recess 83a of the rod portion 83 against the spring force of the snap ring 90 until the annular recess 8a of the inner rod 8 aligns itself with the annular recess 83a of the rod portion 83, and the snap ring 90 expands itself into the annular recess 8a of the inner rod 8. Since the depth of the annular recess 8a of the inner rod 8 is defined to be smaller than the diameter of the wire member forming the snap ring 90, the inner rod 8 and the coupling 81 are thus securely coupled with each other.

However, when the inner rod 8 is pulled away from the coupling 81 with a sufficient force, the snap ring 90 can be forced completely into the annular recess 83a of the rod portion 83 against the spring force of the snap ring 90, and the inner rod 8 can be disconnected from the coupling 81. Thus, the coupling 81 of this embodiment allows the slider 64 and the rod member 3 to be detachable from each other, and assembling and repairing of the roller shade may be facilitated. For instance, if the drive mechanism should fail with the screen sheet 2 in its fully extended position, it would still be possible to retract the screen sheet 2 by the action of the spring-loaded retractor 1 by removing the rod member 3 from the slider 64 by means of the coupling 81.

Figure 12:
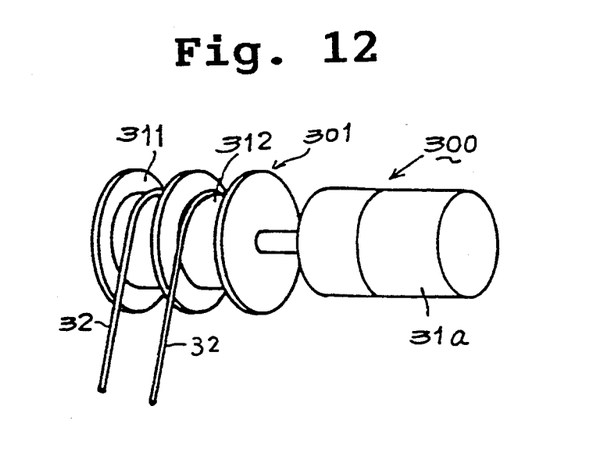
FIG. 12 is a perspective view showing a modified embodiment of the winding reel.

FIG. 12 shows a modified embodiment of the drive mechanism 300 which comprises a winding reel 301 separated into two reel parts 311 and 312 by providing three flanges on the winding reel 301 instead of two. According to this embodiment, it is possible to reduce the likelihood of the two spans of the wire 32 to be entangled with each other.

Figure 13A:
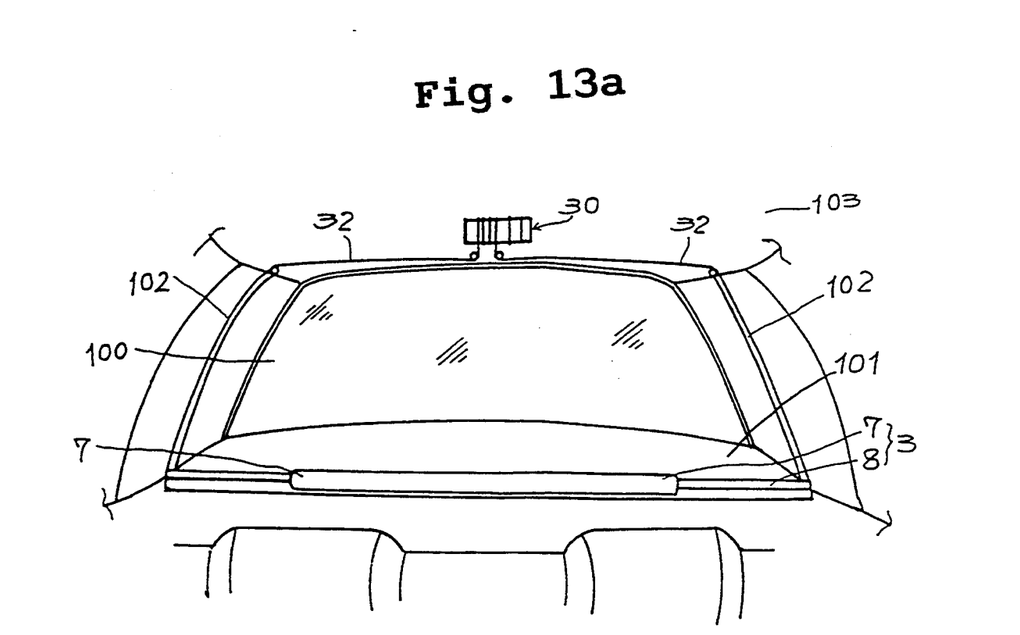
FIGS. 13a and 13b are front views showing yet another embodiment of the roller shade according to the present invention.
Figure 13B:
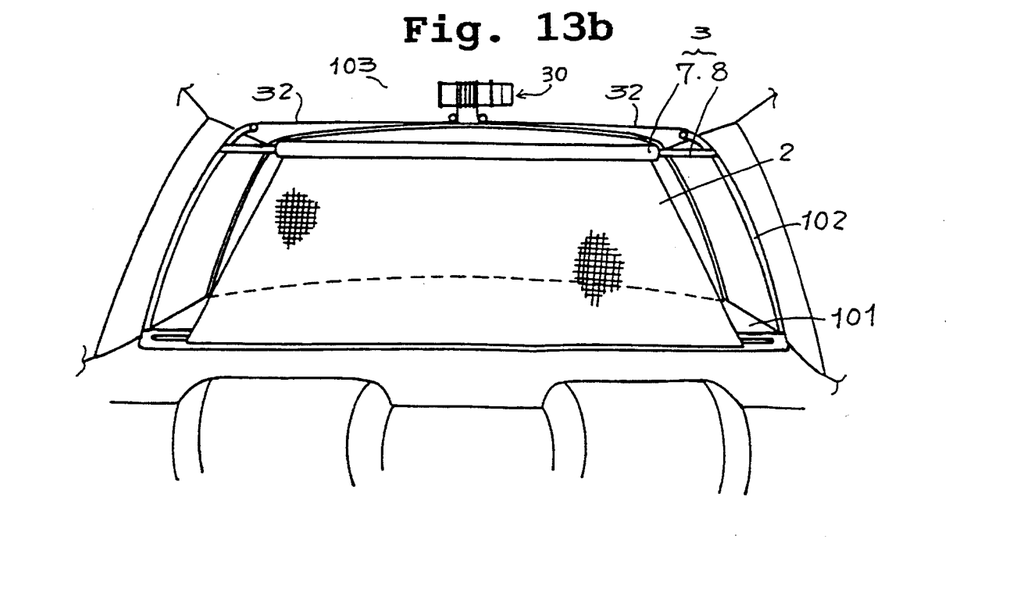

In the embodiment illustrated in FIGS. 13a and 13b, the retractor 1 is placed along the forward edge of a rear shelf 101 of a passenger car, and a pair guide rails 102 are provided along the right and left rear pillars in the form of guide grooves. The front edge of the rear shelf 101 may be provided with a recess which is adapted to receive the retractor 1 and, optionally, the rod member 3 in its fully retracted state, so that the roller shade may be hidden from the view of the vehicle occupant when it is not used and fully retracted. A drive unit 30 is placed in a central part of the roof as seen in FIGS. 13a and 13b. This drive unit 30 is controlled by switches provided in the dashboard of the vehicle although it is not shown in the drawings.

According to this embodiment also, the screen sheet 2 may be paid out from the retractor 1 by means of the drive unit 30 and the pull wire 32 connected between the drive unit 30 and the two ends of the rod member 3 which are guided along the guide rails 102 against the spring force of the torsion coil spring 5 incorporated in the retractor 1 until the rod member 3 reaches its uppermost position as illustrated in FIG. 13b. Since the rod member 3 is provided with the telescopic structure which allows its length to be varied according to the lateral distance between the two guide rails 102 as the rod member 3 is moved vertically, the roller shade can accommodate any changes in the lateral width of the window or the opening which is to be screened. When the drive unit 30 is reversed and the rod member 3 is allowed to move downward, the screen sheet 2 is rolled up by the retractor 1 under the spring force of its torsion coil spring 5.

If desired, the control unit 30 may be provided with two motors each having its own winding reel so that the two spans of the wire may be wound by two separate units. This allows smaller motors to be used, and may offer an advantage in utilizing a limited mounting space.

The rod members 3 were straight in the above described embodiments, but it is also possible to use a curved rod member 3 which may be so curved as to avoid interferences with other objects or maximize the usable space in the passenger compartment.

Figure 14A:
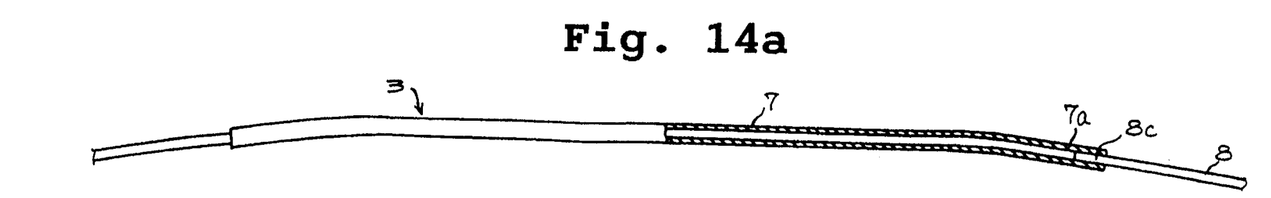
FIGS. 14a through 14e show various different embodiments of the rod member according to the present invention partly in section.
Figure 14B:
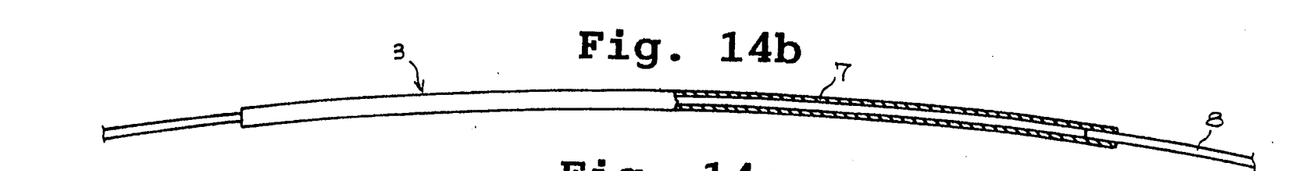

The embodiment illustrated in FIG. 14a consists of a rod member 3 which is straight in its middle part and both end portions. The end portions and the middle part are connected by curved portions provided in the outer tube 7. The telescopic connection between the outer tube 7 and each of the inner rod 8 is made in the straight section on each end of the rod member 3 between an external end 7a of the outer tube 7 and an internal end 8c of the inner rod 8. The embodiment illustrated in FIG. 14b consists of a curved rod member 3 which is lightly curved over its entire length. These rod members 3 are suitable use on automotive rear windshields having curved upper and/or lower edges. In this case, the telescopic connection between the outer tube 7 and each of the inner rod 8 may be made between an external end 7a of the outer tube 7 and an internal end 8c of the inner rod 8 which are provided with a same radius of curvature.

Figure 14C:
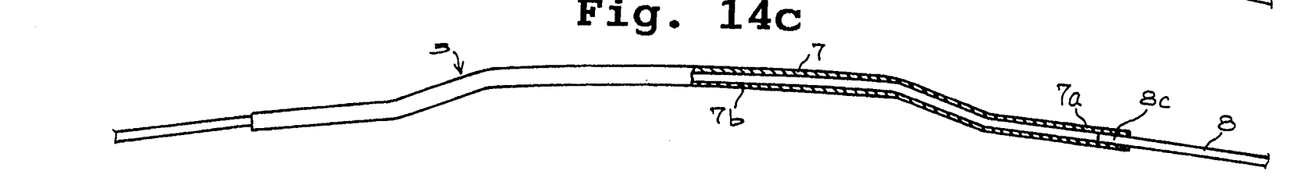
Figure 14D:
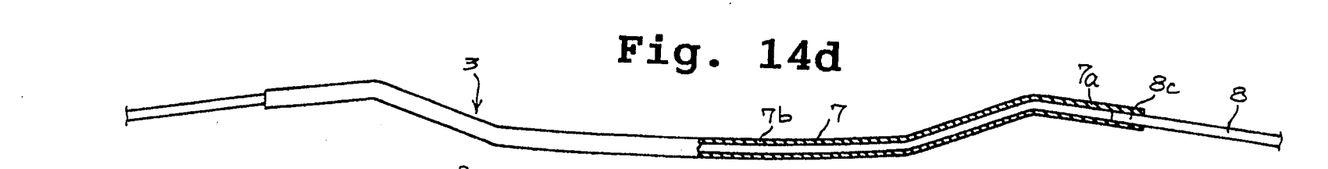

The embodiments illustrated in FIGS. 14c and 14d are each provided with a middle part 7b which is offset, either upward or downward as the case may be, from the rest of the rod member 3. These embodiments are suitable for avoiding interferences, for instance, from loudspeakers mounted in the rear shelf of the vehicle and maximizing the space for the passenger compartment. In these cases, if the offset central parts 7b are allowed to rotate around the axial line of the rod member 3, the direction of the offsetting may be reversed during use. Therefore, for these embodiments, it is preferable to prohibit the rotation of the central part around the axial line of the rod member relative to the sliders during use. It can be accomplished in a number of ways with reference to FIGS. 15a–15f. For instance, the outer tube 7 and the inner rod 8 may be provided with elliptic, rectangular, polygonal or the non-circular cross-sections. Alternatively, a key and slot structure may be provided between the outer tube 7 and the inner rod 8 as a means for prohibiting the relative rotation of the two members around the axial line.

Figure 14E:
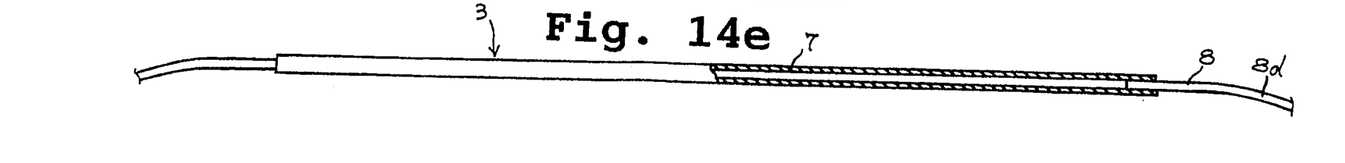
Figure 15A:
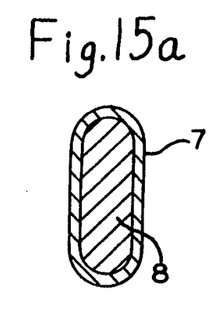
FIGS. 15a-15f show longitudinal cross-sectional views of various different embodiments of the coupling rod member.
Figure 15B:
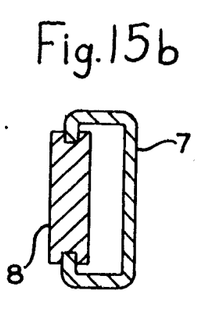
Figure 15C:
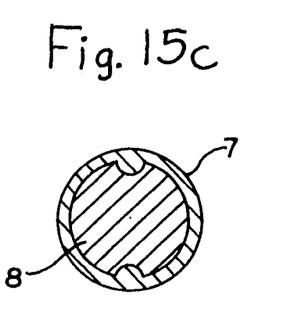
Figure 15D:
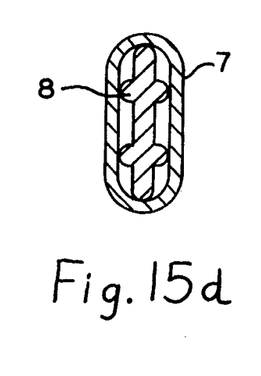
Figure 15E:
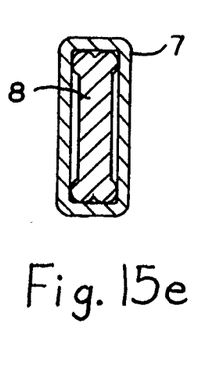
Figure 15F:
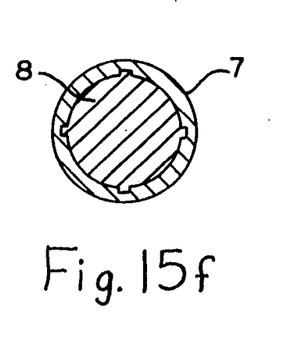

In the embodiment illustrated in FIG. 14e, the outer tube 7 is straight over its entire length, but the inner rods 8 are each slightly bent at its outer end. This embodiment is also useful in avoiding interferences, and maximizing the usable space of the passenger compartment. In this case, there is no need to prohibit the relative rotation of the outer tube and the inner rods around the axial line.

The above described embodiments were directed to the application in the roller shade for the automotive rear windshield, but the application of the present invention is by no means limited to such an area. The present invention can be applied as a cover for separating a passenger compartment from a luggage compartment in hatch-back, station wagon and other kinds of automobiles.

Thus, according to the present invention, by allowing telescopic action of the rod member of a roller shade, the roller shade can be favorably applied to various applications where a windshield, a window or an opening having a shape other than an exact rectangle is desired to be covered.

Although the present invention has been described in terms of a preferred embodiment thereof, it is obvious to a person skilled in the art that various alterations and modifications are possible without departing from the scope of the present invention which is set forth in the appended claims.

What we claim is:

1. A roller shade for covering a designated area such as an opening or a window, comprising:
    a laterally elongated retractor provided on a first side of said designated area;
    a screen sheet having a trailing edge connected to said retractor and a leading edge;
    a rod member attached to said leading edge of said screen sheet and curved so as to be adapted to an associated peripheral edge of said designated area;
    guide means for guiding said rod member at its two ends along each side of said area adjacent an associated one of two ends of said first side;
    biasing means for urging said retractor in a direction to retract and wind said screen sheet around said retractor;
    powered drive means for moving said rod member in a direction to extend said screen sheet by pulling said rod member away from said retractor; said drive means including:
        a reel actuated by a motor;
        two spans of wire with each span extending between said reel and an associated end of said rod member; and
        wire guide means for guiding said two spans of wire between said two ends of said rod member and said reel;
    said rod member being provided with coupling means for allowing telescopic movement of each end of said rod member to vary a length of said rod member as said rod member moves toward and away from said retractor along said guide means while said rod member maintains a fixed angular orientation with respect to said associated peripheral edge of said designated area.

2. A roller shade according to claim 1, wherein said reel is provided on a central part of a second side of said designated area opposing said retractor on said first side, and said wire guide means comprises pulleys arranged along an edge of said designated area.

3. A roller shade according to claim 1, wherein said reel is provided on a central part of said first side of said designated area adjacent said retractor, and said wire guide means comprises pulleys arranged along an edge of said designated area.

4. A roller shade according to claim 1, wherein said rod member consists of an outer tube and a pair of inner rods each telescopically received in an associated one of two extreme ends of said outer tube.

5. A roller shade according to claim 4, wherein an outer end of each of said inner rods is guided by said guide means by way of a slider which is slidably engaged by said guide means and pivotally coupled to said outer end of said inner rod.

6. A roller shade according to claim 5, wherein sliders are detachably coupled to the outer ends of said inner rods, respectively.

7. A roller shade according to claim 1, wherein said guide means consists of a pair of guide rails extending along either side of said rod member, each end of said rod member being fitted on an associated one of said guide rails.

8. A roller shade according to claim 1, wherein said guide means consists of a pair of guide slots extending along either side of said rod member, each end of said rod member being received in an associated one of said guide slots.

9. A roller shade according to claim 1, wherein said roller shade is adapted to cover said designated area consisting of a trapezoidal automotive rear windshield.

10. A roller shade according to claim 1, wherein said roller shade is adapted to cover said designated area consisting of an opening defined by a front edge of a rear shelf, inwardly curved side pillars and a roof of a passenger car.

11. A roller shade according to claim 1, wherein said roller shade is adapted to cover said designated area consisting of a boundary between a passenger compartment and a luggage compartment of a vehicle.

12. A roller shade according to claim 1, wherein said first side consists of an upper side of a peripheral edge of said designated area.

13. A roller shade for covering a designated area such as an opening or a window, comprising:
   a laterally elongated retractor provided on a first side of said designated area;
   a screen sheet having a trailing edge connected to said retractor and a leading edge;
   a rod member attached to said leading edge of said screen sheet and curved so as to be adapted to an associated peripheral edge of said designated area;
   guide means for guiding said rod member at its two ends along each side of said area adjacent an associated one of two ends of said first side;
   biasing means for urging said retractor in a direction to retract and wind said screen sheet around said retractor;
   powered drive means for moving said rod member in a direction to extend said screen sheet by pulling said rod member away from said retractor; said drive means including:
   a reel actuated by a motor and disposed on a second side of said designated area opposing said first side;
   a single span of wire having a first end connected to a fixed point located adjacent an end of said second side, a middle part passed through said rod member from one end thereof adjacent said fixed point to the other end thereof, and a second end connected to said reel; and
   wire guide means for guiding said wire between said other end of said rod member and said winding reel;
   said rod member being provided with coupling means for allowing telescopic movement of each end of said rod member to vary a length of said rod member as said rod member moves toward and away from said retractor along said guide means while said rod member maintains a fixed angular orientation with respect to said associated peripheral edge of said designated area.

14. A roller shade for covering a designated area such as an opening or a window having a non-rectangular shape, the roller shade comprising:
   a laterally elongated retractor provided on a first side of said designated area;
   a screen sheet having a trailing edge connected to said retractor and a leading edge, said screen sheet substantially conforming to said designated area when said screen sheet is fully extended;
   a rod member attached to said leading edge of said screen sheet and curved so as to be adapted to an associated peripheral edge of said designated area;
   guide means for guiding said rod member at its two ends along each side of said area adjacent an associated one of two ends of said first side; and
   biasing means for urging said retractor in a direction to retract and wind said screen sheet around said retractor;
   said rod member being provided with coupling means for allowing telescopic movement of each end of said rod member to vary a length of said rod member as said rod member moves toward and away from said retractor along said guide means while said rod member maintains a fixed angular orientation with respect to said associated peripheral edge of said designated area, said each end of said rod member is fitted on an associated one of said guide means by way of an open-ended slit defined at said end of said rod member, in a detachable manner.

15. A roller shade according to claim 14, further comprising powered drive means for moving said rod member in a direction to extend said screen sheet by pulling said rod member away from said retractor.

16. A roller shade for covering a designated area such as an opening or a window having a non-rectangular shape, the roller shade comprising:
   a laterally elongated retractor provided on a first side of said designated area;
   a screen sheet having a trailing edge connected to said retractor and a leading edge, said screen sheet substantially conforming to said designated area when said screen sheet is fully extended;
   a rod member attached to said leading edge of said screen sheet and curved so as to be adapted to an associated peripheral edge of said designated area;
   guide means for guiding said rod member at its two ends along each side of said area adjacent an associated one of two ends of said first side; and
   biasing means for urging said retractor in a direction to retract and wind said screen sheet around said retractor;
   said rod member being provided with coupling means for allowing telescopic movement of each end of said rod member to vary a length of said rod member as said rod member moves toward and away from said retractor along said guide means while said rod member maintains a fixed angular orientation with respect to said associated peripheral edge of said designated area, said coupling means comprising a rod having a non-circular cross section received in a tube defining a bore complementary to said rod.

17. A roller shade for covering a designated area such as an opening or a window, comprising:
a laterally elongated retractor provided on a first side of said designated area;
a screen sheet having a trailing edge connected to said retractor and a leading edge;
a rod member attached to said leading edge of said screen sheet and curved so as to be adapted to an associated peripheral edge of said designated area;
guide means for guiding said rod member at its two ends along each side of said area adjacent an associated one of two ends of said first side; and
biasing means for urging said retractor in a direction to retract and wind said screen sheet around said retractor;
said rod member being provided with coupling means for allowing telescopic movement of each end of said rod member to vary a length of said rod member as said rod member moves toward and away from said retractor along said guide means while said rod member maintains a fixed angular orientation with respect to said associated peripheral edge of said designated area wherein said coupling means comprises a key and slot structure.

18. A roller shade according to claim 17, wherein said guide means consist of a pair of curved guide rails extending along either side of said rod member, and said coupling means further comprises a pair of articulate joints each allowing an associated one of the two ends of said rod member to rotate with respect to said guide rail in a plane defined by said guide rail.

19. A roller shade for covering a designated area such as an opening or a window having a non-rectangular shape, the roller shade comprising:
a laterally elongated retractor provided on a first side of said designated area;
a screen sheet having a trailing edge connected to said retractor and a leading edge, said screen sheet substantially conforming to said designated area when said screen sheet is fully extended;
a rod member attached to said leading edge of said screen sheet and curved so as to be adapted to an associated peripheral edge of said designated area;
guide means for guiding said rod member at its two ends along each side of said area adjacent an associated one of two ends of said first side; and
biasing means for urging said retractor in a direction to retract and wind said screen sheet around said retractor;
said rod member being provided with coupling means for allowing telescopic movement of each end of said rod member to vary a length of said rod member as said rod member moves toward and away from said retractor along said guide means while said rod member maintains a fixed angular orientation with respect to said associated peripheral edge of said designated area, said coupling means comprises a rod having a non-circular cross section received in a tube defining a bore complementary to said rod, said guide means consisting of a pair of curved guide rails extending along either side of said rod member, and said coupling means further comprising a pair of articulate joints each allowing an associated one of the two ends of said rod member to rotate with respect to said guide rail in a plane defined by said guide rail.

20. A roller shade for covering a designated area such as an opening or a window, comprising:
a laterally elongated retractor provided on a first side of said designated area;
a screen sheet having a trailing edge connected to said retractor and a leading edge;
a rod member attached to said leading edge of said screen sheet;
guide means for guiding said rod member at its two ends along each side of said area adjacent an associated one of two ends of said first side;
biasing means for urging said retractor in a direction to retract and wind said screen sheet around said retractor; and
powered drive means for moving said rod member in a direction to extend said screen sheet by pulling said rod member away from said retractor, said drive means comprising a reel actuated by a motor, two spans of wire with each span extending between said reel and an associated end of said rod member, and wire guide means for guiding said two spans of wire between said two ends of said rod member and said reel;
said rod member being provided with a telescopic structure allowing its length to be varied as said rod member moves toward and away from said retractor along said guide means.

21. A roller shade according to claim 20, wherein said reel is provided on a central part of a second side of said designated area opposing said retractor on said first side, and said wire guide means comprises pulleys arranged along an edge of said designated area.

22. A roller shade according to claim 20, wherein said reel is provided on a central part of said first side of said designated area adjacent said retractor, and said wire guide means comprises pulleys arranged along an edge of said designated area.

23. A roller shade according to claim 20, wherein said reel is disposed on a second side of said designated area opposing said first side.

24. A roller shade according to claim 20, wherein said rod member consists of an outer tube and a pair of inner rods each telescopically received in an associated one of two extreme ends of said outer tube.

25. A roller shade according to claim 24, wherein an outer end of each of said inner rods is guided by said guide means by way of a slider which is slidably engaged by said guide means and pivotally coupled to said outer end of said inner rod.

26. A roller shade according to claim 24, wherein said sliders are detachably coupled to the outer ends of said inner rods, respectively.

27. A roller shade according to claim 20, wherein said rod member is curved.

28. A roller shade according to claim 20, wherein said guide means consists of a pair of guide rails extending along either side of said rod member, each end of said rod member being fitted on an associated one of said guide rails.

29. A roller shade according to claim 20, wherein said each end of said rod member is fitted on an associated one of said guide rails by way of an open-ended slit defined at said end of said rod member, in a detachable manner.

30. A roller shade according to claim 20, wherein said guide means consists of a pair of guide slots extending along either side of said rod member, each end of said rod member being received in an associated one of said guide slots.

31. A roller shade according to claim 20, wherein said roller shade is adapted to cover said designated area consisting of a trapezoidal automotive rear windshield.

32. A roller shade according to claim 20, wherein said roller shade is adapted to cover said designated area consisting of an opening defined by a front edge of a rear shelf, inwardly curved side pillars and roof of a passenger car.

33. A roller shade according to claim 20, wherein said roller shade is adapted to cover said designated area consisting of a boundary between a passenger compartment and a luggage compartment of a vehicle.

34. A roller shade according to claim 20, wherein said screen sheet is rectangular in shape.

35. A roller shade according to claim 20, wherein said screen sheet is non-rectangular in shape.

* * * * *